United States Patent
Johncox (10) Patent No.: US 9,708,122 B1
(45) Date of Patent: Jul. 18, 2017

(54) STORAGE AND HANDLING SYSTEM FOR INDUSTRIAL MATERIALS

(71) Applicant: Big Steel Rack LLC, Jackson, MI (US)

(72) Inventor: Ronald W Johncox, Jackson, MI (US)

(73) Assignee: Big Steel Rack LLC, Jackson, MI (US)

( * ) Notice: Subject to any disclaimer, the term of this patent is extended or adjusted under 35 U.S.C. 154(b) by 166 days.

(21) Appl. No.: 14/657,642

(22) Filed: Mar. 13, 2015

Related U.S. Application Data (60) Provisional application No. 61/952,392, filed on Mar. 13, 2014.

(51) Int. Cl.
*B65G 1/02* (2006.01)
*B65D 19/06* (2006.01)

(52) U.S. Cl.
CPC ............. *B65G 1/023* (2013.01); *B65D 19/06* (2013.01); *B65G 1/02* (2013.01); *B65G 1/026* (2013.01)

(58) Field of Classification Search
CPC .......... B65G 1/026; B65G 1/02; B65G 1/023; B65D 2519/00278; B65D 2519/00273; B65D 2519/00283; B65D 2519/00293; B65D 2519/00527; B62B 5/0093; B62B 3/02; A47B 31/00
See application file for complete search history.

(56) References Cited

U.S. PATENT DOCUMENTS

| | | | | |
|---|---|---|---|---|
| 3,561,608 A | * | 2/1971 | Weider | B65G 1/02 211/183 |
| 4,998,023 A | * | 3/1991 | Kitts | B62B 3/02 211/188 |
| 5,280,933 A | * | 1/1994 | Finneyfrock | F24B 15/00 211/49.1 |
| 5,312,004 A | * | 5/1994 | Krummell | A47B 53/00 211/151 |

(Continued)

FOREIGN PATENT DOCUMENTS

| | | | | |
|---|---|---|---|---|
| DE | 19942584 A1 | * | 3/2001 | ............. A47B 46/00 |
| DE | EP 2006223 A1 | * | 12/2008 | ............. A47B 46/00 |

(Continued)

OTHER PUBLICATIONS

Cisco-Eagle, Steel Solutions Sheet Metal Rack, http://www.cisco-eagle.com/catalog/c-7200-steel-solutions-sheet-metal-rack.aspx, 2015.

*Primary Examiner* — Glenn Myers
(74) *Attorney, Agent, or Firm* — Endurance Law Group, PLC (57) ABSTRACT

A storage and handling system for industrial sheet goods and bar stocks comprises a plurality of vertically stacked slide sets supported in a framework so that a rear half of the framework comprises an storage bay and a front half comprises a utilization bay. A material storage pallet is slidably disposed in each said slide set. The depth of each pallet is designed so that when pushed rearwardly into the storage (Continued)

bay region of the framework, the entire utilization bay is clear and open. As a result, when any one pallet is pulled into the utilization bay, workers can easily access the raw materials stored on that pallet. The system may be paired with a roller cart configured to transfer one of the pallets to and from the framework. The utilization bay is open from above to accommodate a crane-operated load lifter.

11 Claims, 9 Drawing Sheets

(56) References Cited

U.S. PATENT DOCUMENTS

| | | | | |
|---|---|---|---|---|
| 5,419,444 | A * | 5/1995 | Strom | B65G 1/026 |
| | | | | 211/151 |
| 8,308,408 | B2 * | 11/2012 | Gaudette | B65D 19/44 |
| | | | | 410/32 |
| 2003/0219323 | A1 * | 11/2003 | Shoup | B65D 19/06 |
| | | | | 410/31 |
| 2008/0217276 | A1 * | 9/2008 | Brady | B65D 19/12 |
| | | | | 211/195 |
| 2012/0034056 | A1 * | 2/2012 | Schmidgall | B60P 7/12 |
| | | | | 414/502 |
| 2013/0248674 | A1 * | 9/2013 | Johnson | B29C 44/181 |
| | | | | 248/346.02 |

FOREIGN PATENT DOCUMENTS

| | | | | |
|---|---|---|---|---|
| DE | 102009032656 | B3 * | 3/2011 | B65D 19/385 |
| ES | WO 0187743 | A1 * | 11/2001 | A47B 46/00 |
| FR | 2698251 | A1 * | 5/1994 | A47B 88/16 |

* cited by examiner

FIG. 10

STORAGE AND HANDLING SYSTEM FOR INDUSTRIAL MATERIALS

CROSS REFERENCE TO RELATED APPLICATIONS

This application claims priority to Provisional Patent Application No. 61/952,392 filed Mar. 13, 2014, the entire disclosure of which is hereby incorporated by reference and relied upon.

BACKGROUND OF THE INVENTION

Field of the Invention

The invention relates generally to storage and handling systems for metal fabricating materials like sheet stocks and bar stocks.

Description of Related Art

In industrial operations, metal parts and objects are formed through stamping, fabricating, spinning, slide forming and roll forming technologies, and other value-added processes. In North America, it has been estimated that the metal forming industry represents approximately $113-billion in annual sales. Raw material for metalworking processes often comprises large and bulky materials in sheet and tube and bar-stock form. When stored in large quantities, typically in the ubiquitous pallet rack or cantilever rack, the effective handling of sheet-metal and metal tubing can be burdensome and inefficient.

A pallet rack is a material handling storage aid system designed to store materials on pallets (or "skids"). Although there are many varieties of pallet rack, all types allow for the storage of palletized materials in horizontal rows with multiple levels. Forklift trucks are usually an integral part of any pallet rack system as they are usually required to place the loaded pallets onto the racks for storage. Pallet racks are an essential element of most modern warehouses, manufacturing facilities, retail centers, and other storage and distribution facilities. Nevertheless, pallet racks have certain inherent disadvantages. Disadvantages of pallet rack type storage systems include restricted access to all stock at any given moment, ineffectiveness in storing sheet-goods and other non-palletized items, and relatively high expense.

A cantilever rack allows for the safe and convenient storage of long, bulky or irregular items without an underlying pallet. Single face cantilever racks are accessed on only one side for placement against a wall; double face cantilever racks are accessible from both sides. Cantilever racks are an ideal storage solution in many situations. Compared to standard pallet racks, cantilever racks are: generally easy to use with no front column in the way; fast to load and unload; flexible in that loads may be placed anywhere along the entire length of a row on a cantilever rack; compact because the lack of a front column saves horizontal space normally lost in a rack structure; and generally more selective in that any load space is immediately accessible. Additionally, cantilever racks become more economical as load length increases. In sum, cantilever racks are especially useful for storing long, bulky, and/or oddly-shaped loads.

Despite their many advantages, cantilever racks also possess some inherent disadvantages. Chief among these are the lack of highly efficient material organization, especially when multiple material types/sizes are placed in the same rack space. Whenever multiple material types/sizes are placed in the same rack space, a worker may encounter difficulty removing materials from higher-levels. In extreme cases, a worker may even injury themselves if he or she slips while removing materials from the higher-levels. Likewise, damage might occur to nearby people or objects while removing bulky/sharp materials from any level of the typical prior art rack system. In every instance, however, the storing of multiple material types/sizes in the same rack space results in excessive worker time. Valuable worker time is consumed when a worker must first remove unwanted items in order to access buried or less-accessible materials in the rack, and then return the unwanted items before continuing with the task at hand.

Rolling sheet racks are known in the art, such as those marketed by Cisco-Eagle of Dallas, Tex. Racks of this type resemble cabinets with heavy-duty flat drawer systems that are manually extended to permit access to sheet materials or other low profile components with a crane. Prior art sheet racks, however, lack the advantages of a palletized load carrying system that can be handled by forklift truck. There is therefore a need for an improved raw material storage and handling system for large and bulky materials in sheet and tube and bar-stock form. The improved storage system preferably retains the benefits of both pallet rack and cantilever rack system, but without the burdensome and inefficient aspects of each.

BRIEF SUMMARY OF THE INVENTION

According to a first aspect of this invention. A storage and handling system for raw materials is provided. The system includes a framework. The framework comprises a left bank of columns and a right bank of columns. The left bank of columns is disposed generally parallel to the right bank of columns. The left bank of columns includes a plurality of individual left columns each supported in a generally vertical orientation and arranged in a linear array. The right bank of columns includes a plurality of individual right columns each supported in a generally vertical orientation arranged in a linear array. A plurality of slide sets are supported in the framework. Each slide set is vertically spaced from the next adjacent slide set. Each slide set has a sliding length. A material storage pallet is slidably disposed in each slide set. The pallet comprises a generally planar body with an upper surface configured to receive raw materials for storage. The upper surface has a width and a depth. The depth of the pallet is approximately equal to one-half the sliding length of the slide set.

According to a second aspect of this invention, a material storage pallet is provided of the type for supporting raw materials in a storage and handling system. The pallet comprises a generally planar body having an upper surface configured to receive the raw materials. The body has a generally rectangular shape formed by a front edge and a left edge and a rear edge and a right edge connected to one another at respective corners. A pair of inset fork tubes is disposed parallel to the left and right edges. The fork tubes intersect the front and rear edges so that forklift tines can be used to lift and move the pallet when laden with raw materials.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Referring to the figures, wherein like numerals indicate like or corresponding parts throughout the several views. A storage and handling system for raw materials is generally shown at 10 in FIGS. 1-5. The raw materials are illustrated as sheet goods 12 in FIGS. 1-3 and 7. In FIG. 8, the raw materials are shown in the form of tubing and bar stocks 14. Naturally, the present invention is not intended to be limited by the specific type of raw material stored or handled thereby. Furthermore, the storage and handling of raw materials for metalworking operations are a natural application of the present invention. However, references to raw materials for metalworking are but an example; the invention may be used to store non-metallic raw materials with equal effectiveness.

Figure 1:
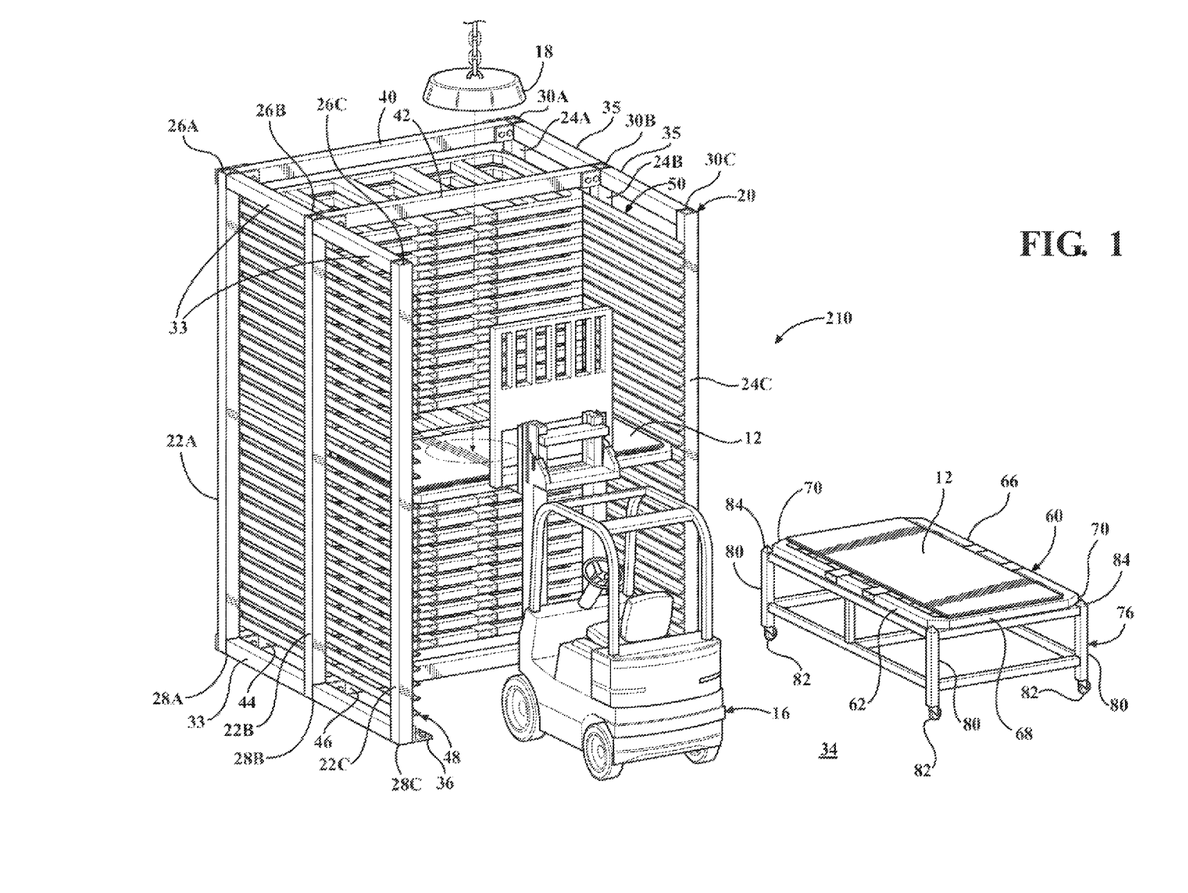
FIG. 1 is a perspective view showing the storage and handling system for raw materials according to one embodiment of this invention in a warehouse setting with one pallet thereof being moved by a forklift truck.

The system 10 is shown in FIG. 1 in the context of a warehouse or other setting in which raw materials in sheet form 12 are stored and then, as needed, moved for further handling by a forklift truck 16. Although not readily visible in FIG. 1, the forklift truck 16 is fitted with the typical fork tines that extend like two prongs from its front end. The system 10 may be advantageously combined with a load-lifting device 18, which may include any suitable end effect such as a sheet lift, magnet, sling, or vacuum system, to name but a few of the many options. Load lifters 18 are frequently used for handling a variety of loads in conjunction with crane or hoist systems and beam trolleys. The load lifter 18 grabs or otherwise attaches to the top sheet of the load 12 so that the top sheet can be carried to a remote location where it is then released. While only one storage system 10 is depicted in FIG. 1, it should be understood that multiple systems 10 could be ganged together—side-by-side in banks—for larger material storage needs.

Figure 2:
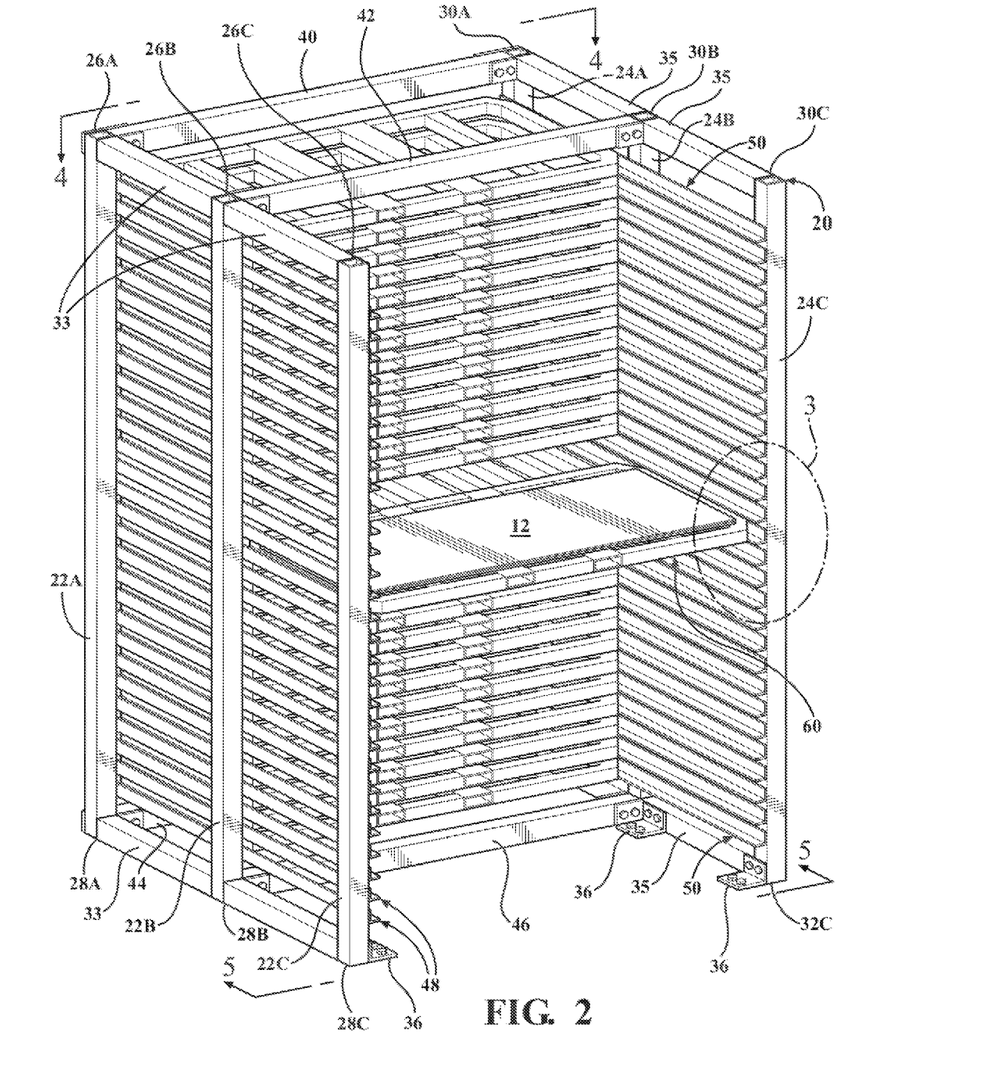
FIG. 2 is a perspective view showing the storage and handling system as depicted in FIG. 1.
Figure 3:
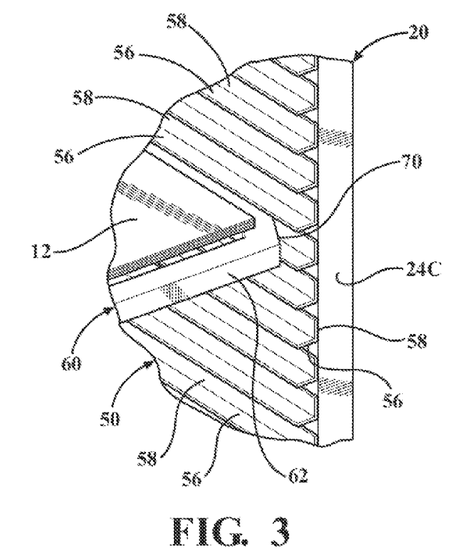
FIG. 3 is an enlarged view of the area circumscribed at 3 in FIG. 2.
Figure 4:
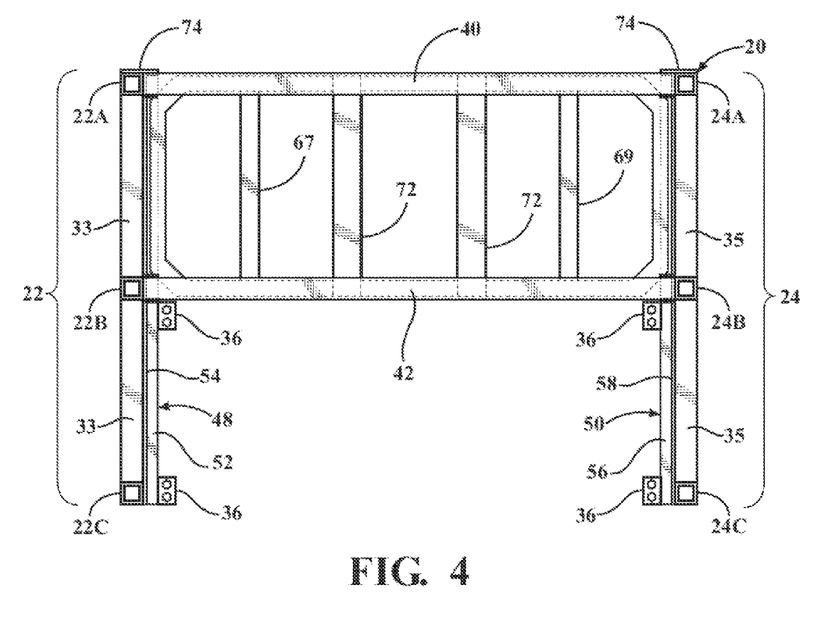
FIG. 4 is a top view of the storage and handling system as taken generally from lines 4-4 in FIG. 2.
Figure 5:
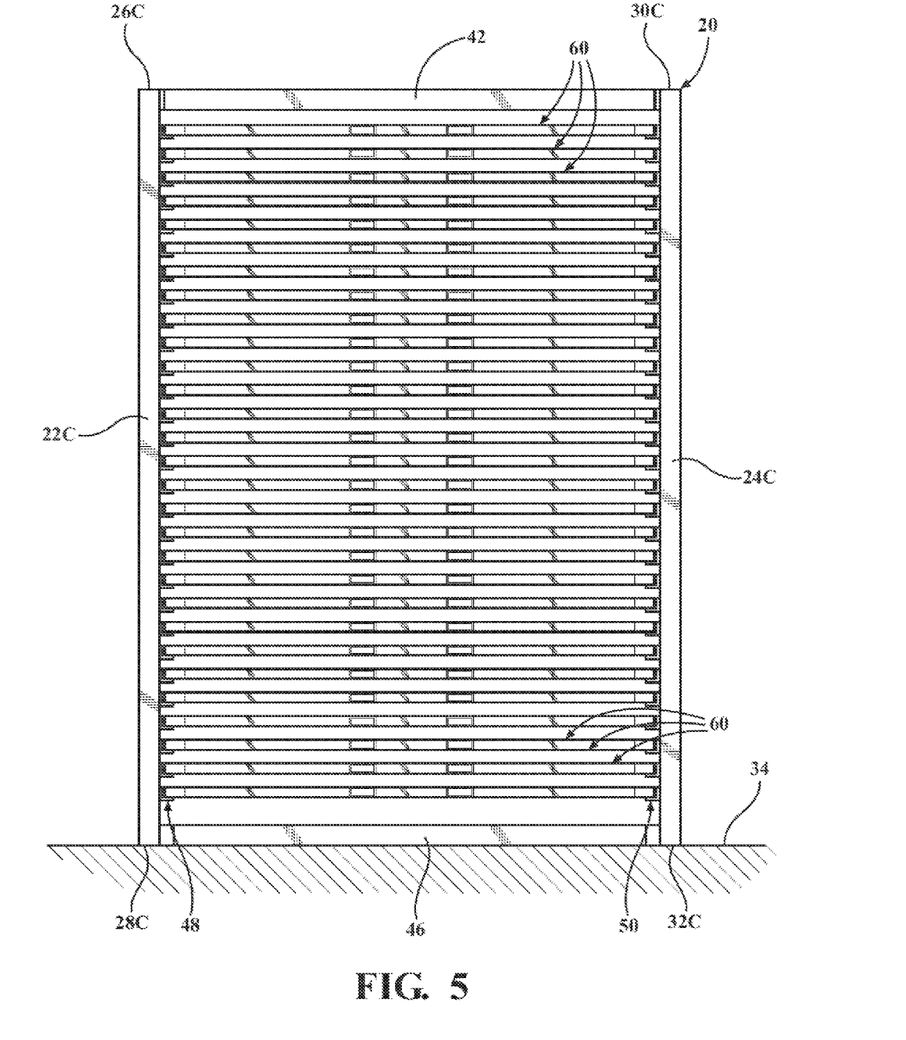
FIG. 5 is a front view of the storage and handling system as taken generally from lines 5-5 in FIG. 2.

The storage system 10 is shown in FIG. 2 including a sturdy external framework, generally indicated at 20, formed from sturdy square tube stock bolted, welded or otherwise fixed together in a box-like structure. The framework 20 may take various forms as it serves is purpose as a cabinet body or skeletal support structure. In the illustrated embodiments, the framework 20 comprises a left bank of columns 22 and a right bank of columns 24. The left bank of columns 22 includes a plurality of individual left columns 22A-C each supported in a generally vertical orientation and arranged in a linear array. The right bank of columns 24 includes a plurality of individual right columns 24A-C each supported in a generally vertical orientation arranged in a linear array. Each of the left columns 22 comprises a generally tubular member having a generally rectangular cross-section. Likewise, each of the right columns 24 comprises a generally tubular member also having a generally rectangular cross-section. In the illustrated embodiment, the left 22 and right 24 columns are fabricated from a rigid metallic material however any other suitable material may be substituted. The left bank of columns 22 is disposed generally parallel to the right bank of columns 24. In this embodiment, the left bank of columns 22 is shown comprising specifically a left rear column 22A and a left intermediate column 22B and a left front column 22C. Similarly, the right bank of columns 24 comprises a right rear column 24A and a right intermediate column 24B and a right front column 24C. Those of skill in the art will envision other combinations of columns and/or other expressions for the framework 20 which may include an enclosed cabinet shell rather than the depicted open structure.

Each of the left columns 22A-C has a top end 26A-C and a bottom end 28A-C, respectively. In like manner, each of the right columns 24A-C has a top end 30A-C and a bottom end 32A-C. The bottom ends 28A-C, 32A-C of the left 22A-C and the right 24A-C columns are configured to rest directly upon an underlying floor surface 34. Rails 33 may be welded across the top and bottom ends of the left columns 22A-C to create a frame-like structure. Similarly, rails 35 may be welded across the top and bottom ends of the right columns 24A-C. The rails 33, 35 enhance the structural rigidity of the system 10 and help to distribute the weight load. The bottoms of the left 22A-C and the right 24A-C columns may be provided with multiple anchoring flanges 36 through which a suitable fastening device can be placed to anchor the system 10 in position. The anchoring flanges 38 can be integral (e.g., welded) or a loose-piece element. Loose piece anchoring flanges 36 have the advantage that they can be placed on either the inside or the outside of the system 10 to suit each user's preference. Each of the top 26A, 30A and bottom 28A, 32A ends of the left rear 22A and the right rear 24A columns may be provided with at least one assembly tab 38. Similarly, each of the top 26B, 30B and bottom 28B, 32B ends of the left intermediate 22B and the right intermediate 24B columns cooperate with at least one assembly tab 38. The assembly tabs 38 can be integral (e.g., welded in place) or attached as loose-piece elements. While the assembly tabs 38 may take many different forms, those depicted in the accompanying drawings are presented as a pair of ears that each include two bolt holes disposed therein for purposes to be described further below. The anchoring flanges 38 are preferably designed to cooperate with the bolt holes in the assembly tabs 38 so that the same fastener bolts can be used for both.

The framework 20 of the illustrated embodiment further includes a rear upper cross member 40 and an intermediate upper cross member 42. The rear 40 and intermediate 42 upper cross members each comprise elongated members made from generally the same material as the columns 22, 24 and have generally the same length. Each upper cross member 40, 42 extends between opposite left and right ends. The left end of the rear upper cross member 40 directly attaches, via the assembly tab 38, to the top end 26A of the left rear column 22A. The right end of the rear upper cross member 40 directly attaches, again via an assembly tab 38, to the top end 30A of the right rear column 24A. In similar fashion, the left end of the intermediate upper cross member 42 directly attaches via an assembly tab 38 to the top end 26B of the left intermediate column 22B, and the right end of the intermediate upper cross member 42 directly attaches to the top end 30B of the right intermediate column 24B. In this manner, the left 22 and right 24 banks of columns are rigidly connected to one another and held securely their parallel spacing.

The framework 20 may, optionally, include a rear lower cross member 44 and an intermediate lower cross member 46. The rear 44 and intermediate 46 lower cross members each comprise elongated members extending between opposite left and right ends Like their upper cross member counterparts 40, 42, the rear 44 and intermediate 46 lower cross members each comprise elongated members made from generally the same material as the columns 22, 24 and have generally the same length. The respective left and right ends of the lower cross members 44, 46 attached directly (via assembly tabs 38) to the bottom ends 28A,B and 32A,B of the rear 22A, 24A and intermediate 22B, 24B columns. The lower cross members 44, 46 are described as being optional in that they are effectively redundant once the frameworks 20 is fully erected and anchored to the floor 34. However, the lower cross members 44, 46 are helpful during the assembly process and create a sturdy structure which can be moved into final resting position without over-stressing any of the assembly tabs 38 or bending any of the members.

A plurality of slide sets are supported between the left 22 and right 24 banks of columns in the framework 20. Each slide set is vertically spaced from the next adjacent slide set in a stacked array, somewhat akin to the drawer slides found in a chest of drawers. Each slide set comprises a left slideway 48 and a right slideway 50. The left slideway 48 may be formed as a generally L-shaped member having a horizontal shelf 52 and a vertical sidewall 54. Likewise, the right slideway 50 comprises a generally L-shaped member composed of a horizontal shelf 56 and a vertical sidewall 58. The slideways 48, 50 may be formed by opposing pieces of stock angle iron. Within each slide set, the horizontal shelf 52 of the left slideway 48 directly opposes and is generally co-planar with the horizontal shelf 56 of the right slideway 50. That is to say, the two opposing (i.e., horizontally aligned) horizontal shelves 52, 56 project inwardly into the interior space of the framework 10. And, because the left 48 and right 50 slideways are mirror images of one another, each slide set may be said to have a defined sliding length which is generally observed as the longitudinal dimension of the respective horizontal shelves 52, 56.

The slide sets are fixed within the framework 10 so that they are both supported by the columns 22, 24 and add structural rigidity to the columns 22, 24. In particular, the vertical sidewall 54 of the left slideway 48 is directly fixedly attached to the left rear column 22A and the left intermediate column 22B and also to the left front column 22C, as perhaps best show in FIG. 2. Similarly, the vertical sidewall 58 of the right slideway 50 is directly fixedly attached to the right rear column 24A and the right intermediate column 24B and the right front column 24C. Attachment of the slideways 48, 50 to their respective left 22A-C and right 24A-C columns may be accomplished by any suitable technique, including welding, bolts, rivets and the like.

Specially formed pallets, generally indicated at 60, are stacked in parallel inside the framework 10. In the illustrated examples, more than twenty pallets 60 are stored in the framework 10, however the specific number of pallets 60 is dependent on the overall height and pallet-to-pallet spacing as may be specified for any given application. For example, when using the storage and handling system 10 to store thin, flat materials such as the sheet goods 12 like that depicted in FIGS. 1-3, then very close spacing of the pallets 60 will be possible. However, if the goods are of a relatively thick character, then greater spacing between pallets 60 will be required inside the framework 10.

One material storage pallet 60 is slidably disposed in or by each slide set and configured so that its left edge 64 rests upon the left slideway 48 and its right edge 68 rests upon the right slideway 50 of the slide set. The vertical spacing interval between adjacent horizontal shelves 52, 56 determines the spacing intervals between adjacent pallets 60. Although the pallet 60 spacing intervals are illustrated as being equal along the entire height of the storage and handling system 10, variable spacing is certainly contemplated for mixed-use applications.

The pallet 60 comprises a generally planar body has an upper surface configured to receive raw materials for metalworking. The upper surface is generally rectangular as may be defined by a width that spans from left 22 to right 24 banks of columns and a depth that spans from rear 22A, 24A to intermediate 22B, 24B columns. In this manner, the depth of the pallet 60 may be seen as approximately equal to one-half the sliding length of each slide set. As mentioned, the pallet 60 has a generally rectangular shape whose perimeter is formed by a front edge 62 and a left edge 64 and a rear edge 66 and a right edge 68 connected at respective corners 70. Preferably, the corners 70 are chamfered to facilitate insertion into the framework 10. That is to say, the corners 70 may be formed as relatively large bevels connecting two adjoining edges 62-68 so that when returning the pallet 60 to the storage and handling system 10 with the use of a forklift 16, if the operator has not perfectly aligned the pallet 60, the chamfered corners 70 will engage the vertical columns 22C, 24C of the framework 10 and gently re-orient the pallet 60 with a camming or funneling type action. In the illustrated example perhaps best seen in FIGS. 4 and 6, the chamfered corners 70 may be generally symmetrical, i.e., set at approximately 45 degrees relative to either adjoining edge 62-68. However, asymmetrical configurations are certainly possible, as well as rounded configurations.

Figure 6:
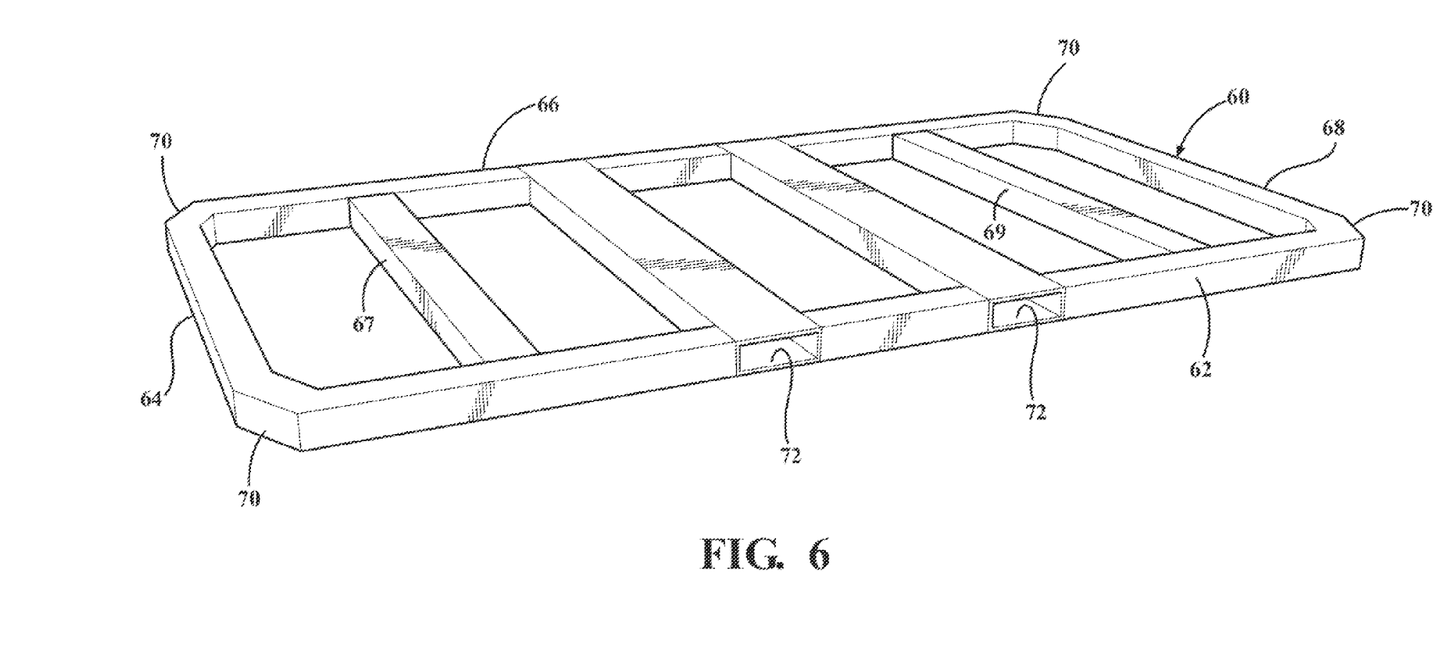
FIG. 6 is a perspective view of a pallet according to one embodiment of this invention.

A detail of a pallet 60 according to one embodiment of this invention is shown in FIG. 6. The pallet 60 is formed by a tubular steel (or other sturdy material) frame so as to fit inside the framework 10 and rest one the inwardly projecting cantilever portions of two opposing horizontal shelves 52, 56. The pallet 60 is formed with two centrally-located fork tubes 72 which serve the dual function of structural support for any load carried on the pallet 60 (e.g., sheet metal 12 as in FIGS. 1 and 2) and also as integral receiving sleeves for the fork tines of the forklift 16. Because the fork tubes 72 completely surround the fork tines of the forklift 16, the pallet 60 cannot tip or slide sideways off the tines during transport, thus substantially enhancing material handling safety even when the load weight distribution on the pallet 60 is uneven. The fork tubes 72 are disposed generally parallel to the left 64 and right 68 edges of the pallet 60, and intersect the front 62 and rear 66 edges. That is to say, the fork tubes 72 are co-planar with the edges 62-68 so that their ends open through the bodies of the front 62 and rear 66 edges. A left crosspiece 67 extends between the front 62 and rear 66 edges, and is disposed generally parallel between the left edge 64 and the fork tubes 72. Similarly, a right crosspiece 69 extends between the front 62 and rear 66 edges. The right crosspiece 69 is disposed generally parallel between the right edge 68 and the fork tubes 72. The crosspieces 67, 69 add structural integrity to the pallet 60 and increase the supporting surface area upon which material load 12 are carried.

Each pallet 60 also preferably includes a reference label (not shown) on the outer exposed surface of its front edge 62. Corresponding reference labels (also not shown) can be applied to the framework 10, e.g., on the front left 22C and/or front right 24C column, so that a pallet 60 is coordinated with a predetermined location in the storage and handling system 10 to facilitate highly-organized inventory processes.

A flange stop 74 (FIG. 4) closes the rear of each slideway 48, 50 to prevent pallets 60 from being accidentally pushed through (i.e., out the back) of the storage and handling system 10. If additional support is needed for heavy pallets 60, then the horizontal shelves 52, 56 can be welded or otherwise affixed to the flange stop. Additionally or alternatively, brackets (not shown) may be incorporated to undergird the cantilever portions of the horizontal shelves 52, 56. If still further support is needed for unusually heavy pallets 60 stored in the storage and handling system 10, transverse horizontal shelf (not shown) can be attached to the inside back face of the framework 10 in horizontal alignment with the left and right horizontal shelves 52, 56 to provide underneath support to three full edges 64, 66, 68 of the pallet 60.

Notably, there is not a cross member adjoining the top ends 26C, 30C of front left 22C and front right 24C columns, thus creating a utilization bay which is openly accessible from above. The utilization bay may be defined as the front half of the framework 20, or that region bounded by the front left 22C, intermediate left 22B, intermediate right 24B and front right 24C columns. The rear half of the framework 20 may then be characterized as a storage bay in which the pallets 60 are normally kept until needed. The storage bay area is thus bounded by the rear left 22A, intermediate left 22B, intermediate right 24B and rear right 24A columns. The depth of the utilization bay is approximately equal to the depth of a pallet 60, and likewise the depth of the storage bay is approximately equal to the depth of a pallet 60. In this manner the depths of the utilization bay and of the storage bay are approximately equal, with the combined sum of both being equal to the defined sliding length of the slide set or the longitudinal dimension of the horizontal shelves 52, 56 thereof.

Any pallet 60 that may be of interest can be pulled (via forklift 16) from its normally retracted position in the storage bay out to the utilization bay, as shown in FIGS. 1 and 2, without entirely removing the pallet 60 from the framework 20. While in the utilization bay, a user can inspect/remove the sheet goods 12 and return the pallet 60 into the storage bay while the pallet 60 remains supported within the framework 20. Another advantage of the utilization bay is to serve as a staging area for interactions with the load lifter 18. When the framework 20 is properly located within the working zone of a load lifter, the open utilization bay enables the load lifter 18 to descend to meet any pallet 60 and there remove a top one of the sheet goods 12.

Those of skill in the art will appreciate that the utilization bay that is open from above is an optional feature and may be omitted without detracting from the otherwise organized storage attributes of this invention.

Figure 7:
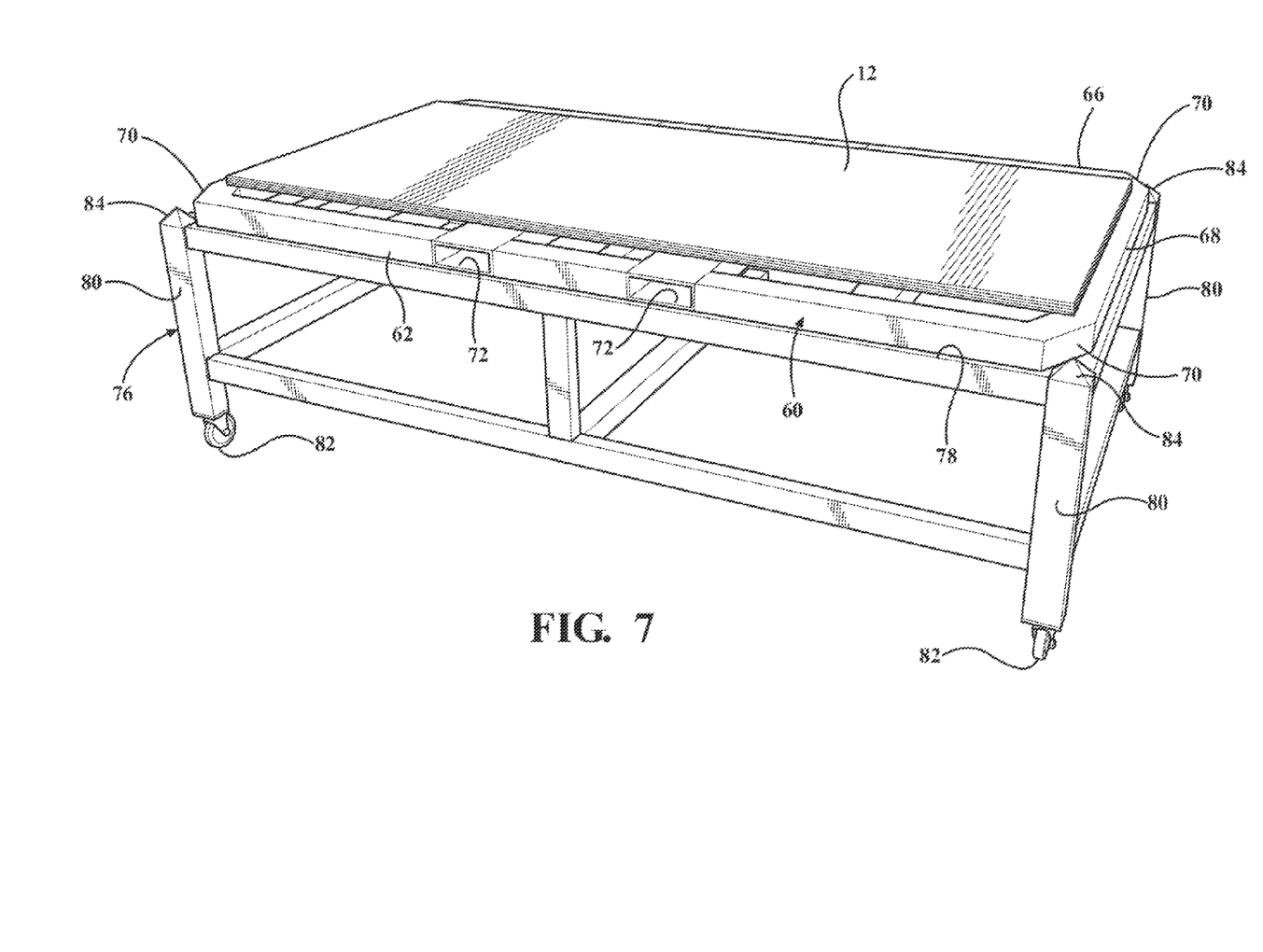
FIG. 7 is a perspective view of a roller cart according to one embodiment of this invention upon which is resting a pallet which in turn is supporting raw materials in the form of sheet metal.
Figure 8:
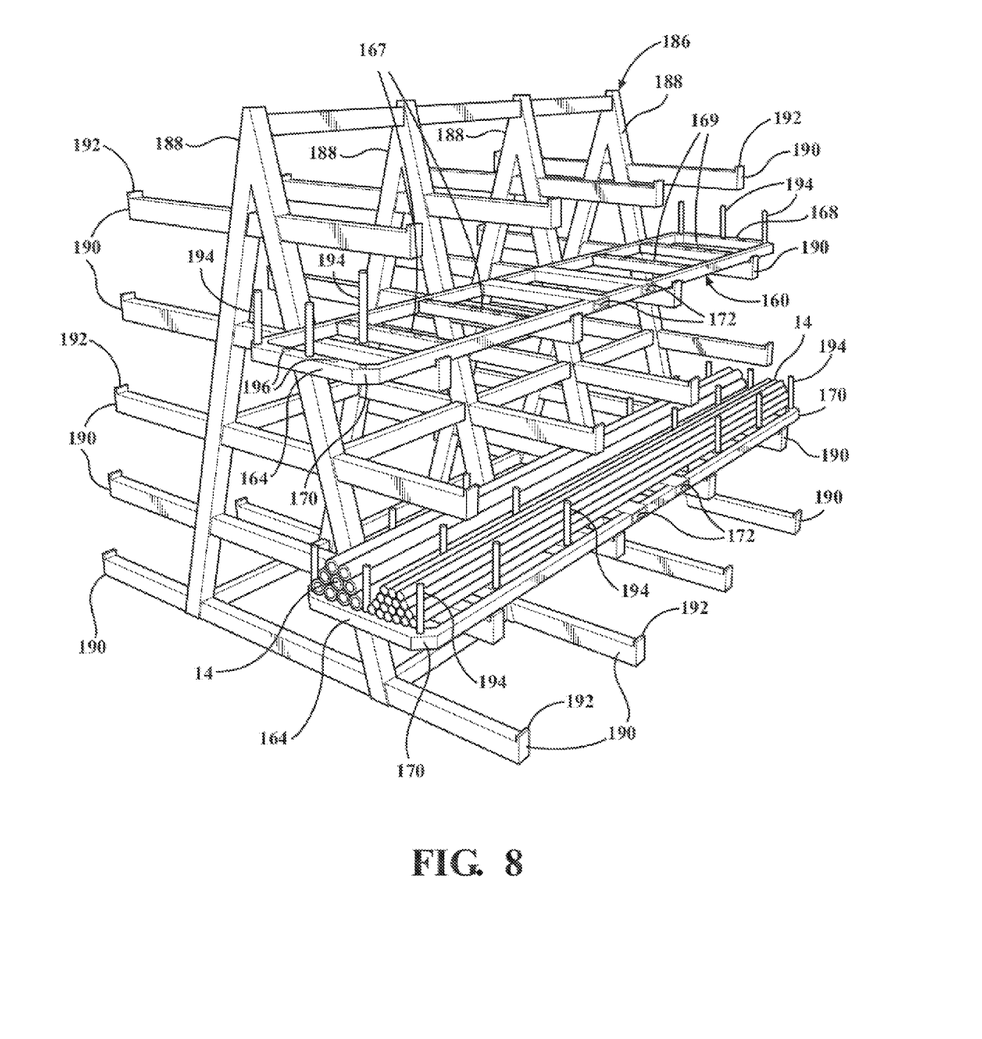
FIG. 8 is a perspective view of a pallet according to a second embodiment of this invention, which in turn is supported in a cantilever style storage rack.

The storage and handling system 10 may further include an optional roller cart, generally shown at 76 in FIGS. 1 and 7, which is specially configured to safely transfer one pallet 60 at a time to and from the framework 20. Preferably, the cart 76 is dimensioned to receive the pallet 60 with little to no overhang. The roller cart 76 includes a table 78 designed with a generally flat rectangular receiving surface for the pallet 60. The table 78 is supported by four corner legs 80. Each corner leg 80 has a bottom end and a top end. A caster wheel 82 is affixed to the bottom end of each corner leg 80. A domed cap 84 is affixed to or otherwise formed on the top end of each corner leg 80. The domed caps 84 are shown as pyramid shapes, however rounded and cone-like shapes may be equally feasible. In the preferred embodiment, the cart 76 is dimensioned so that the chamfered corners 70 fit perfectly between the caps 62. When a forklift 16 operator is lowering a pallet 60 to the pallet cart 76, if the pallet 60 is not perfectly aligned over the cart 76, the chamfered corners 70 will engage the domed caps 62 and gently re-orient the pallet 60 with a wedge-like action so that it comes to rest centered on the cart 76. Once the operator withdraws forklift 16, the cart 76 (with pallet 60 and material load 12) can be easily wheeled by a human worker to another location. If, during manual (i.e., ambulatory) transport a cart 76 in motion collides with another object, the pallet 60 will remain securely in the centered position by way of the restraining effect provided by the domed caps 62. When the operator is finished removing material from the pallet 60, the pallet 60 is returned to its predetermined location within the rack 40 (as shown in FIG. 1).

Turning now to FIG. 8, a second embodiment of the pallet 160 is shown. In this example, like or corresponding reference numbers offset by 100 are used to indicate features of the pallet 160 similar to those of the pallet 60 described above in connection with FIG. 6. For example, reference number 170 in FIG. 8 depicts a corner of the pallet 160 as corresponds with corner 70 in FIG. 6. Likewise, reference number 172 in FIG. 8 depicts fork tubes as corresponds with fork tubes 72 in FIG. 6. One notable difference between the aforementioned pallet 60 and the elongated pallet 160 of FIG. 8 is the inclusion of twin left crosspieces 167 and twin right crosspieces 169.

The pallet rack in this example comprises a cantilever-type rack, generally indicated at 186. The pallet rack 186 comprises, in this exemplary configuration, a series of A-frames 188 fitted with cantilever arms 190 formed from sturdy square tube stock that are bolted or otherwise fixed together. Specially formed pallets 160, are stacked in parallel on the connected A-frames 188. In the illustrated example, two pallets 160 are stored upon the arms 190 of the cantilever rack 186, and yet provision is available to receive an additional seven pallets 160. Of course, the specific number of pallets 160 that can be supported in the cantilever rack 186 will be dependent on the overall height and pallet-to-pallet spacing specified. Lips 192 may be formed on the distal end of each cantilever arm 190 to restrain material roll-off. Although the elongated pallet 160 spacing intervals are illustrated as being equal along the entire height of the pallet rack 186, variable spacing is certainly contemplated for mixed-use applications. The longitudinal length of a pallet rack 186 can be easily extended by connecting additional A-frames 188 in end-to-end fashion. In settings where access to the rack 186 is only possible from one side, the configuration of the A-frame 188 can be changed to cantilever arms 190 on only one side and a flat vertical back on the opposite side (not shown).

The pallets 160 may be fitted with organizer pins 194 that can be selectively placed in any of several receiving holes 196 that have been formed in the left 164 and right 168 edges, as well as in the crosspieces 167, 169. Stop tabs (not shown) on the bottom surface of each pallet 160 may be incorporated to limit insertion depth of the organizer pins 194 within each receiving hole 196. Alternatively, the organizer pins 194 can be fitted with a shoulder or stub or other suitable depth-limiting feature. As shown, the organizer pins 194 can be custom-arranged on each pallet 160 to allocate space according the material(s) stored thereon. Although not shown, the roller cart 76 can be reconfigured to accommodate the elongated pallet 160 of FIG. 8.

Detailed assembly instructions for the storage and handling system 10 will be described presently. The following description presumes that the left bank of columns 22 are supplied as a pre-assembled unit with all of the left slideways 48 attached. Similarly, the right bank of columns 24 are supplied as a unit with all of the right slideways 50 attached. Recommended assembly protocols direct that the framework 20 be assembled on the floor 34 with the unit oriented on its back and then tipped into an upright position.

Initially, the assembly workers place the rear upper 40 and rear lower 44 cross members on the ground parallel to one another with ends aligned and at a spacing equal to the vertical height of the columns 22, 24. The pre-assembled left bank of columns 22 is positioned so that the rear left column 22A rests on the floor 34 with its top end 26A directly adjacent the left end of the rear upper cross member 40 and its bottom end 28A directly adjacent the left end of the rear lower cross member 44. Using a drift punch or other tool aide, pre-drilled holes are aligned with the corresponding assembly tabs 38 and bolts are loosely inserted as place holders. The same procedure is repeated to loosely attach the pre-assembled right bank of columns 24.

Next, the intermediate upper 42 and intermediate lower 46 cross members are attached, via the assembly tabs 38, to the corresponding top 26B, 30B ends of the left 22B and right 24B intermediate columns. Bolts (not shown) are extended through holes in each cross member 42, 46 and accompanied by a washer on both sides. A nut is hand tightened on each bolt. The framework 20 is then tipped off its back and into a standing position like that shown in FIG. 2. At this stage, all of the bolts are placed in available assembly tabs 38 with washers and a nut. Confirm that every juncture is fitted with two bolts facing inward, and that each bolt is mated with two washers and a hand-tightened nut. Anchor flanges 36 are attached to the bottom ends 28A,C and 32 A,C of the rear 22A, 24A and front 22C, 24C columns. Next, the framework 20 should be shimmed and leveled using steel shims or other suitable material for leveling that is capable of bearing the full loaded weight of the system 10 on a concrete surface 34. If full bearing cannot be achieved with the available shims, a non-shrink grout should be used instead of shims. The framework 20 is then anchored to the floor 34. In one example, installer is recommended to anchor the system 10 to the floor 34 using a ⅝" diameter minimum ASTM A-36 or A307 threaded rod. Anchors should have a minimum embedment into the concrete slab of about 4.5" and bond to concrete with a suitable adhesive, such as acrylic Red Head A7 available from ITW Commercial Construction of Elgin, Ill. The framework 20 is re-squared and then all bolts/nuts are torque to a minimum specification, such as 150 Ft. Lbs. Finally, the pallets 60 are installed according to corresponding shelf location (per applied labels) and loaded with materials 12, 14.

Figure 9:
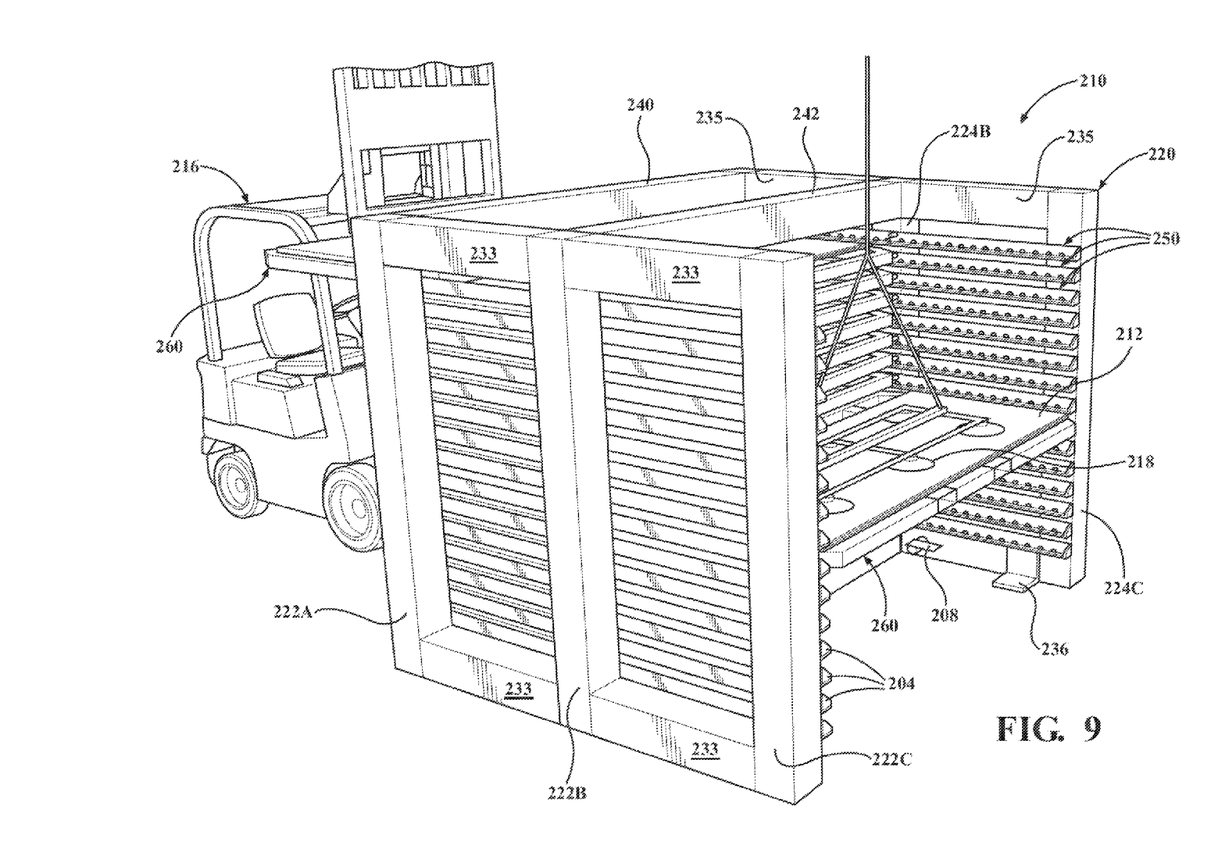
FIG. 9 is a perspective view of a storage and handling system according to yet another embodiment of this invention in a warehouse setting with one pallet thereof being moved by a forklift truck and another pallet thereof being accessed by a crane with vacuum end feature.
Figure 10:
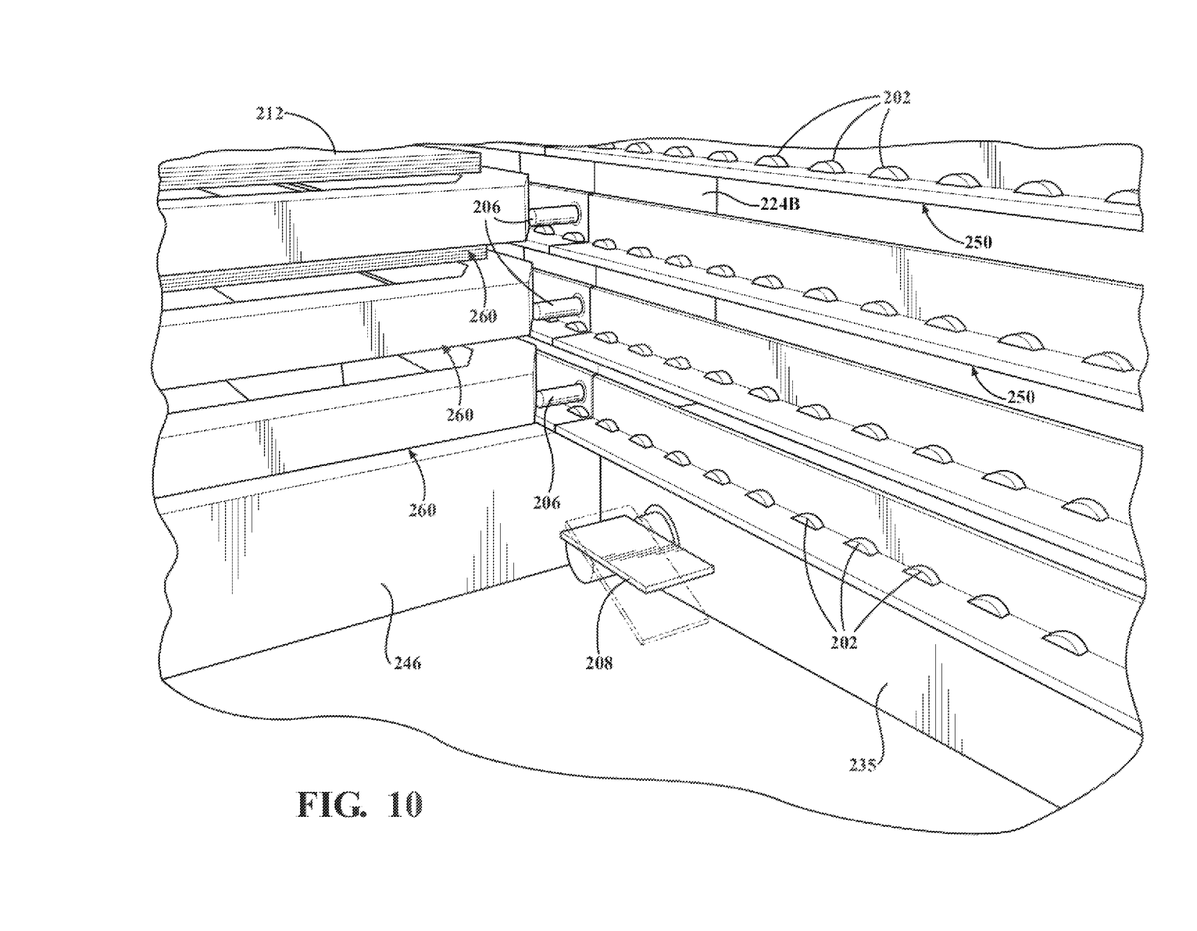
FIG. 10 is an enlarged view of the system of FIG. 9 to illustrate the foot-pedal operated pallet release feature.

Turning now to FIGS. 9-10 yet another embodiment of the system 210 is illustrated by way of example. In this example, like or corresponding reference numbers offset by 200 are used to indicate features of the framework 220 and slideways 248, 250 similar to those described above in connection with FIGS. 1-5. For example, reference number 212 depicts sheet goods like those identified with reference number 12 in FIG. 1. Reference numbers 233 and 235 depict rails corresponding to the rails 33 and 35. Reference number 236 depicts anchoring flanges corresponding with anchoring flanges 36. Reference numbers 240 and 242 depicts a cross members that corresponds with the respective cross members 40 and 42 in FIG. 1. And reference number 246 depicts an intermediate lower cross member that corresponds with the previously described member 46. The pallet 260 in this example is presumed to be generally equivalent to the pallet 60 of FIG. 6. In FIG. 9, the framework 220 is shown having fewer slideways 248, 250 so that an average human worker can reach the uppermost pallet 260 while standing flat-footed on the floor 234. Another notable difference is that the slideways 248, 250 are fitted with rollers 202 and end stops 204 at the terminal ends adjacent the left 222C and right 224C columns in the utilization bay. Furthermore, the back-side of the framework 220, i.e., between the left 222A and right 224A columns, is removed of the aforementioned flange stop 74 (FIG. 4) so that the rear of each slideway 248, 250 is opened to allow pallets 260 in the storage bay to be accessed directly through the back of the storage and handling system 210.

In this embodiment, the pallets 260 can be loaded and unloaded into the storage bay from the rear by forklift truck 216, or loaded and unloaded from the utilization bay via load lifter 218 or manually. The load lifter 218 is depicted as a 6-pad suction device controlled through a crane or hoist mechanism (not shown), however many alternative grasping devices are possible. The system 210 is substantially more versatile than prior art designs incapable of two-sided access by forklift 216, load lifter 218 or humans. Rollers 202 in the slideways 248, 250 facilitate manual shifting of the pallets 260 into and out of the utilization bay from the storage bay. Because a loaded pallet 260 has the potential to be very heavy, the momentum generated by pulling the pallet into the utilization bay could be significant. To prevent a pallet 260 from unexpectedly pulling out of its slideways 248, 250, end stops 204 are provided. When a pallet 260 strikes the end stops 204 at the terminal end of its slideways 248, 250, further movement of the pallet 260 will be arrested.

In order to secure each pallet 260 either in the storage bay or in the utilization bay, a latching feature is incorporated into the system 210. The latching feature is therefore useful to divide the slide sets, i.e., each slideway 248, 250, generally in half to physically separate the utilization bay region of the framework 220 from the storage bay region of the framework 220. The latching feature may take many different forms, and is shown in FIG. 10 in one exemplary configuration of retractable pins 206 that extend in cantilever fashion into the path of the right slideways 250 at a location generally separating the storage bay from the utilization bay, i.e., along the right intermediate column 224B. This particular embodiment contemplates that all of the pins 206 are ganged together and commonly actuated by a cam or lever system (not shown) housed within the right intermediate column 224B perhaps not too dissimilar from a lock system of the type commonly found in multi-drawer filing cabinets. The pins 206 are controlled, in unison, by a foot pedal 208. When an operator depresses the foot pedal 208, as shown in phantom lines in FIG. 10, all of the pins 206 simultaneously retract allowing the operator to manually pull a selected one pallet 260 into the utilization bay. Likewise, the foot pedal 208 is depressed to allowing a pallet 260 in the utilization bay to be returned to the storage bay. The pins 206 may be spring-loaded so that if the operator releases the foot pedal 208 before a moving pallet 260 has cleared the pin 206, the pin 206 will only rub against the side of the pallet 260 and then automatically snap into extended position once the pallet 260 is fully in the storage bay or the utilization bay. Of course, many alternative configurations for a latching feature are possible and within the range of understanding for the person of ordinary skill in this field.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A storage and handling system for raw materials comprising:
    a framework, said framework comprising a left bank of columns and a right bank of columns, said left bank of columns disposed generally parallel to said right bank of columns, said left bank of columns including a plurality of individual left columns each supported in a generally vertical orientation and arranged in a linear array, said right bank of columns including a plurality of individual right columns each supported in a generally vertical orientation arranged in a linear array,
    a plurality of slide sets supported in said framework, each said slide set being vertically spaced from the next adjacent slide set, each said slide set having a sliding length,
    a material storage pallet slidably disposed in each said slide set, said pallet comprising a generally planar body having an upper surface configured to receive raw materials,
    said body having a generally rectangular shape formed by a single-layer tubular frame comprised of a front edge and a left edge and a rear edge and a right edge connected at respective corners, a pair of inset fork tubes each having respective hollow ends, said fork tubes being co-planar with said front and left and rear and right edges along said upper surface of said body to directly support loads carried on said pallet, said fork tubes disposed parallel to said left and right edges, said fork tubes perpendicularly intersecting said front and rear edges with said hollow ends thereof opening through said front and rear edges to receive the tines of a forklift, and
    wherein each said slide sets include rollers and an end stop, and further including a latching feature for dividing each said slide set generally in half to form a utilization bay region of said framework and a storage bay region of said framework.

2. The system of claim 1 wherein said pallet includes a left crosspiece extending between said front and rear edges, said left crosspiece disposed generally parallel between said left edge and said fork tubes, a right crosspiece extending between said front and rear edges, said right crosspiece disposed generally parallel between said right edge and said fork tubes, said left edge of said pallet configured to rest upon said left slideway of said slide set, said right edge of said pallet configured to rest upon said right slideway of said slide set.

3. A storage and handling system for raw materials comprising:
    a framework, said framework comprising a left bank of columns and a right bank of columns, said left bank of columns disposed generally parallel to said right bank of columns, said left bank of columns including a plurality of individual left columns each supported in a generally vertical orientation and arranged in a linear array, said right bank of columns including a plurality of individual right columns each supported in a generally vertical orientation arranged in a linear array,
    a plurality of slide sets supported in said framework, each said slide set being vertically spaced from the next adjacent slide set, each said slide set having a sliding length,
    a material storage pallet slidably disposed in each said slide set, said pallet comprising a generally planar body having an upper surface configured to receive raw materials,
    said body having a generally rectangular shape formed by a single-layer tubular frame comprised of a front edge and a left edge and a rear edge and a right edge connected at respective corners, a pair of inset fork tubes each having respective hollow ends, said fork tubes being co-planar with said front and left and rear and right edges along said upper surface of said body to directly support loads carried on said pallet, said fork tubes disposed parallel to said left and right edges, said fork tubes perpendicularly intersecting said front and rear edges with said hollow ends thereof opening through said front and rear edges to receive the tines of a forklift,
    wherein said left bank of columns comprises a left rear column and a left intermediate column and a left front column, said right bank of columns comprising a right rear column and a right intermediate column and a right front column, and
    wherein each said slide set comprises a left slideway and a right slideway, said left slideway comprising a generally L-shaped member having a horizontal shelf and a vertical sidewall, said right slideway comprising a generally L-shaped member having a horizontal shelf and a vertical sidewall, said horizontal shelf of said left slideway directly opposing and generally co-planar with said horizontal shelf of said right slideway, said vertical sidewall of said left slideway directly fixedly attached to said left rear column and said left intermediate column and said left front column, said vertical sidewall of said right slideway directly fixedly attached to said right rear column and said right intermediate column and said right front column.

4. The system of claim 3 wherein said bottom ends of said left and said right columns each include an anchoring flange.

5. The system of claim 3 wherein each of said left columns comprises a generally tubular member, each of said left columns having a generally rectangular cross-section, each of said right columns comprises a generally tubular member, each of said right columns having a generally rectangular cross-section, each of said left and said right columns being fabricated from a rigid metallic material.

6. The system of claim 3 further including a roller cart configured to transfer one of said pallets to and from said framework.

7. The system of claim 6 wherein said roller cart includes a table having a generally flat rectangular receiving surface, said table supported by four corner legs, each of said corner leg having a bottom end and a top end, a caster wheel affixed to said bottom end of each said corner leg, and a domed cap affixed to said top end of each said corner leg.

8. A storage and handling system for raw materials comprising:
   a framework, said framework comprising a left bank of columns and a right bank of columns, said left bank of columns disposed generally parallel to said right bank of columns, said left bank of columns including a plurality of individual left columns each supported in a generally vertical orientation and arranged in a linear array, said right bank of columns including a plurality of individual right columns each supported in a generally vertical orientation arranged in a linear array,
   a plurality of slide sets supported in said framework, each said slide set being vertically spaced from the next adjacent slide set, each said slide set having a sliding length,
   a material storage pallet slidably disposed in each said slide set, said pallet comprising a generally planar body having an upper surface configured to receive raw materials,
   said body having a generally rectangular shape formed by a single-layer tubular frame comprised of a front edge and a left edge and a rear edge and a right edge connected at respective corners, a pair of inset fork tubes each having respective hollow ends, said fork tubes being co-planar with said front and left and rear and right edges along said upper surface of said body to directly support loads carried on said pallet, said fork tubes disposed parallel to said left and right edges, said fork tubes perpendicularly intersecting said front and rear edges with said hollow ends thereof opening through said front and rear edges to receive the tines of a forklift,
   wherein said left bank of columns comprises a left rear column and a left intermediate column and a left front column, said right bank of columns comprising a right rear column and a right intermediate column and a right front column,
   wherein each of said left columns has a top end and a bottom end, each of said right columns has a top end and a bottom end, said bottom ends of said left and said right columns configured to rest directly upon an underlying floor surface, and
   wherein each of said top and bottom ends of said left rear and said right rear columns includes at least one assembly tab, each of said top and bottom ends of said left intermediate and said right intermediate columns including at least one assembly tab, said assembly tabs each including a bolt hole disposed therein.

9. The system of claim 8 wherein said framework includes a rear upper cross member and an intermediate upper cross member, said rear and intermediate upper cross members each comprising elongated members extending between opposite left and right ends, said left end of said rear upper cross member directly attached to said assembly tab on said top end of said left rear column, said right end of said rear upper cross member directly attached to said assembly tab on said top end of said right rear column, said left end of said intermediate upper cross member directly attached to said assembly tab on said top end of said left intermediate column, said right end of said intermediate upper cross member directly attached to said assembly tab on said top end of said right intermediate column.

10. The system of claim 8 wherein said framework includes a rear lower cross member and an intermediate lower cross member, said rear and intermediate lower cross members each comprising elongated members extending between opposite left and right ends, said left end of said rear lower cross member directly attached to said assembly tab on said bottom end of said left rear column, said right end of said rear lower cross member directly attached to said assembly tab on said bottom end of said right rear column, said left end of said intermediate lower cross member directly attached to said assembly tab on said bottom end of said left intermediate column, said right end of said intermediate lower cross member directly attached to said assembly tab on said bottom end of said right intermediate column.

11. A storage and handling system for raw materials comprising:
    a framework,
    said framework comprising a left bank of columns and a right bank of columns, said left bank of columns including a plurality of individual left columns each supported in a generally vertical orientation and arranged in a linear array, said right bank of columns including a plurality of individual right columns each supported in a generally vertical orientation arranged in a linear array, said left bank of columns disposed generally parallel to said right bank of columns, said left bank of columns comprising a left rear column and a left intermediate column and a left front column, said right bank of columns comprising a right rear column and a right intermediate column and a right front column, each of said left columns comprising a generally tubular member, each of said left columns having a generally rectangular cross-section, each of said right columns comprising a generally tubular member, each of said right columns having a generally rectangular cross-section, each of said left and said right columns being fabricated from a rigid metallic material, each of said left columns having a top end and a bottom end, each of said right columns having a top end and a bottom end, said bottom ends of said left and said right columns configured to rest directly upon an underlying floor surface, said bottom ends of said left and said right columns each including an anchoring flange,
    said framework including a rear upper cross member and an intermediate upper cross member, said rear and intermediate upper cross members each comprising elongated members extending between opposite left and right ends, said left end of said rear upper cross member directly attached to said top end of said left rear column, said right end of said rear upper cross member directly attached to said top end of said right rear column, said left end of said intermediate upper cross member directly attached to said top end of said left intermediate column, said right end of said intermediate upper cross member directly attached to said right intermediate column,
    said framework including a rear lower cross member and an intermediate lower cross member, said rear and intermediate lower cross members each comprising elongated members extending between opposite left and right ends, said left end of said rear lower cross member directly attached to said assembly tab on said bottom end of said left rear column, said right end of said rear lower cross member directly attached to said assembly tab on said bottom end of said right rear column, said left end of said intermediate lower cross member directly attached to said assembly tab on said bottom end of said left intermediate column, said right end of said intermediate lower cross member directly attached to said assembly tab on said bottom end of said right intermediate column, a plurality of slide sets supported in said framework, each said slide set being vertically spaced from the next adjacent slide set, each said slide set having a sliding length, each said slide set comprising a left slideway and a right slideway, said left slideway comprising a generally L-shaped member having a horizontal shelf and a vertical sidewall, said right slideway comprising a generally L-shaped member having a horizontal shelf and a vertical sidewall, said horizontal shelf of said left slideway directly opposing and generally co-planar with said horizontal shelf of said right slideway, said vertical sidewall of said left slideway directly fixedly attached to said left rear column and said left intermediate column and said left front column, said vertical sidewall of said right slideway directly fixedly attached to said right rear column and said right intermediate column and said right front column, a material storage pallet slidably disposed in each said slide set, said pallet comprising a generally planar body having an upper surface configured to receive raw materials, said upper surface having a width and a depth, said depth of said pallet being approximately equal to one-half said sliding length of said slide set, said pallet having a generally rectangular shape formed by a single-layer frame comprised of a front edge and a left edge and a rear edge and a right edge connected at respective corners, said corners being chamfered, said pallet including a pair of inset fork tubes each having respective hollow ends, said fork tubes being co-planar with said front and left and rear and right edges along said upper surface of said body to directly support loads carried on said pallet, said fork tubes disposed parallel to said left and right edges, said fork tubes perpendicularly intersecting said front and rear edges with said hollow ends thereof opening through said front and rear edges to receive the tines of a forklift, a left crosspiece extending between said front and rear edges, said left crosspiece disposed generally parallel between said left edge and said fork tubes, a right crosspiece extending between said front and rear edges, said right crosspiece disposed generally parallel between said right edge and said fork tubes, said left edge of said pallet configured to rest upon said left slideway of said slide set, said right edge of said pallet configured to rest upon said right slideway of said slide set, a roller cart configured to transfer one of said pallets to and from said framework, said roller cart including a table having a generally flat rectangular receiving surface, said table supported by four corner legs, each of said corner leg having a bottom end and a top end, a caster wheel affixed to said bottom end of each said corner leg, a domed cap affixed to said top end of each said corner leg, each said domed cap comprising a pyramid configured to engage a respective one of said chamfered corners of said pallet.

\* \* \* \* \*